(12) United States Patent
Podratzky

(10) Patent No.: US 7,168,533 B2
(45) Date of Patent: Jan. 30, 2007

(54) ROTOR BRAKE AS WELL AS ROTOR AND ROTARY-WING AIRCRAFT WITH SUCH A ROTOR BRAKE

(75) Inventor: Andreas Podratzky, Neufahrn (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 20 days.

(21) Appl. No.: 10/940,045

(22) Filed: Sep. 14, 2004

(65) Prior Publication Data

US 2005/0058536 A1 Mar. 17, 2005

(30) Foreign Application Priority Data

Sep. 16, 2003 (DE) ................ 103 43 055

(51) Int. Cl.
*F16D 59/00* (2006.01)
(52) U.S. Cl. .................... 188/185; 416/169 R
(58) Field of Classification Search ........ 188/73.2, 188/72.4, 72.5, 134, 135, 181 A, 185, 71.2; 192/48.7; 416/169 R
See application file for complete search history.

(56) References Cited

U.S. PATENT DOCUMENTS 1,851,146 A * 3/1932 Banker ............... 192/105 BA
4,216,848 A * 8/1980 Shimodaira ............. 188/71.2
4,219,107 A * 8/1980 Frosch et al. ............ 188/134
5,318,245 A * 6/1994 Sato et al. ............... 242/288
5,529,459 A   6/1996 Pancotti

FOREIGN PATENT DOCUMENTS

DE       195 00 539      7/1995
EP       0 894 712       12/2002

* cited by examiner

*Primary Examiner*—Melanie Torres
(74) *Attorney, Agent, or Firm*—Davidson, Davidson & Kappel, LLC

(57) ABSTRACT

A rotor brake includes a braking force absorption element non-rotatably connected to a rotor shaft; a stationary brake actuator for actuating a braking force transmission element that is functionally coupled to the braking force absorption element so as to exert a braking effect; and at least one rotor speed-controlled, centrifugal force-actuated rotor brake deactivation device. In addition, a rotor having at least one such rotor brake, as well as rotary-wing aircraft, especially a helicopter, having at least one rotor as well as at least one such rotor brake.

17 Claims, 2 Drawing Sheets

BRAKE PRESSURE

ROTOR BRAKE AS WELL AS ROTOR AND ROTARY-WING AIRCRAFT WITH SUCH A ROTOR BRAKE

Priority is claimed to German Patent Application No. DE 103 43 055.5, filed on Sep. 16, 2003, the entire disclosure of which is incorporated by reference herein.

The present invention relates to a rotor brake, to a rotor with such a rotor brake as well as to a rotary-wing aircraft, especially a helicopter, with a rotor and with such a rotor brake.

BACKGROUND

Rotor brakes are used especially in rotary-wing aircraft such as, for example, helicopters, and in some types of helicopters, they are a safety-relevant system. They serve to brake the rotation of a rotor, especially of a tail rotor, when the rotary-wing aircraft or helicopter is on the ground. Rotor brakes are therefore usually arranged at an outlet of a gear of the rotary-wing aircraft where there is a connection to a tail rotor shaft. As a rule, rotor brakes are configured as disk brakes. The braking force here is exerted using calipers, brake linings or pressure disks by mechanical or hydraulic means. In the case of hydraulic brakes, the hydraulic brake system can be coupled either to an independent system or else to the hydraulic system of the rotary-wing aircraft. Occasionally, rotor brakes that are configured as drum brakes are also used. Rotor brakes for rotary-wing aircraft may only be deployed on the ground and only once the (main) rotor has reached a certain speed, which is usually 40% to 50% of the rated rotor speed. Such a limitation is meaningful since, due to aerodynamic forces, the rotor speed drops relatively quickly to about 40% to 50% of the rated rotor speed, but after that, it decreases only relatively slowly. Dimensioning rotor brakes that are already effective at 70% to 100% of the rated rotor speed would entail very strong brakes, a substantial weight of the rotor brake as well as increased manufacturing costs. Therefore, especially in the civilian sector, such a design is neither desired nor, as a rule, necessary.

With conventional rotor brake systems, actuating the rotor brake above a value of 40% to 50% of the rated rotor speed can lead to overheating of the brake disk or of the brake drum since, in this speed range, excessive braking energy is applied to the brake system. In the extreme case, the structure of safety-relevant brake components such as, for example, the brake disk or the brake drum, can be changed and fail. As an example, mention should be made of the fact that an actuation of the rotor brake at 70% rather than at 50% of the rated rotor speed means that approximately twice as much braking energy has to be absorbed by the rotor brake system.

Moreover, an operating error can easily occur with conventional rotor brakes. For example, it is possible for the pilot to accidentally actuate the rotor brake during flight, which usually has fatal consequences. Or the rotor brake can be actuated on the ground before the permissible speed of approximately 40% to 50% of the rated rotor speed has been reached which, as already mentioned, might in certain cases cause a failure or a safety-critical change in the brake system. With hydraulically activated brakes, an erroneous actuation of the braking function can also occur due to a temperature-related increase in the pressure of the hydraulic system or a malfunction of the hydraulic system.

Statutory or national regulations, for example, according to JAR/FAR, require that a display has to indicate any braking force that is exerted on a rotor brake during flight. Such an indication, however, does not prevent the rotor brake from being actuated during the flight or above a permissible rotor speed.

European Patent Document EP 0 894 712 B1 discloses a rotor brake with a system that is supposed to prevent an erroneous actuation of the rotor brake system. The rotor brake comprises a brake disk as well as a brake actuator with a caliper that interacts with the brake disk. The caliper is configured so as to pivot or move with respect to the brake disk. When the rotor is operating at the rated speed or above a permissible rotor speed, the caliper is pivoted away from the brake disk and consequently, even in case of a malfunction or an operating error, it cannot act upon the brake disk and trigger a braking effect. In contrast, when the rotor reaches an appropriately low, permissible rotor speed on the ground, then the caliper is pivoted towards the brake disk and, if actuated, can exert a braking effect on the brake disk. This prior art system is relatively complex in terms of design, it is expensive and heavy, which runs counter to the requirements made of lightweight design in aviation technology.

German Patent Document DE 195 00 539 A1 describes a rotor brake that comprises a braking force absorption element that can be non-rotatably connected to a rotor shaft as well as a stationary brake actuator for actuating a braking force transmission element. The braking force transmission element can be functionally coupled to the braking force absorption element in order to exert a braking effect. The rotor brake has a rotor brake deactivation device having a clutch that can be disengaged into a free-wheeling position when the rotor brake is not in use, especially during flight, and said clutch can be meshed in a form-fitting engagement with a hub of the rotor brake when the rotor brake is to be used.

SUMMARY OF THE INVENTION

An object of the present invention is to provide a rotor brake that avoids the drawbacks inherent in the state of the art to the greatest extent possible and that effectively prevents an operating error or a malfunction. Moreover, a rotor and a rotary-wing aircraft with such a rotor brake are to be proposed.

The present invention provides a rotor brake that includes: a braking force absorption element that is non-rotatably connected to a rotor shaft; a stationary brake actuator for activating a braking force transmission element that can be functionally coupled to the braking force absorption element in order to exert a braking effect; and at least one rotor speed-controlled, centrifugal force-actuated rotor brake deactivation device.

The braking force absorption element can be, for example, a brake disk, a brake drum or a comparable component. A brake lining, for example, can serve as the braking force absorption element. Although within the scope of the rotor brake according to the present invention, mechanically or hydraulically acting brake components are preferred, fundamentally, other elements that are suitable but work differently can be used, for example, inductively working braking force absorption elements or braking force transmission elements or the like.

The rotor speed-controlled, centrifugal force-actuated rotor brake deactivation device provides a relatively simple and effective safety system with which the rotor brake can be deactivated or blocked as a function of a predetermined speed, for example, above 40% to 50% of the rated rotor speed, so that an undesired or inadvertent actuation of the rotor brake due to manual operating errors or malfunctions in the brake system itself is ruled out. In this manner, for example, a manual operating error of the rotor brake during flight of a rotary-wing aircraft as well as a malfunction due to a temperature-related increase in the pressure of a rotor brake hydraulic system or else a hydraulic system malfunction can effectively be avoided. Moreover, a failure due to brake actuation at an excessive rotor speed or a structure change of safety-relevant brake components can be prevented. Since the function of a centrifugal force-actuated system is by definition coupled to the speed and can easily be adjusted or linked to certain speeds, the above-mentioned critical speed ranges or speed limits, which have to be observed for rotor brakes, can be especially simply and effectively used as regulation or control parameters for the rotor brake deactivation device. Moreover, the rotor brake according to the present invention, with its rotor speed-controlled, centrifugal force-actuated rotor brake deactivation device, is relatively simple and inexpensive to realize in terms of design and production, also at a low weight, which is especially advantageous for applications in the aviation sector. Consequently, a rotor brake according to the present invention installed in a rotary-wing aircraft such as, for example, a helicopter or a rotary-wing drone contributes to increasing the operational and flight safety of the rotary-wing aircraft.

Additional preferred and advantageous embodiment features of the rotor brake according to the present invention are described in the specification and claims.

The present invention also provides a rotor that includes the rotor brake described herein. This rotor has essentially the same advantages as those already described in conjunction with the rotor brake according to the present invention.

The present invention also provides a rotary-wing aircraft, especially a helicopter, that includes the rotor described herein. The rotary-wing aircraft according to the present invention offers essentially the same advantages as those already described in conjunction with the rotor brake according to the present invention.

BRIEF DESCRIPTION OF THE DRAWINGS

A preferred embodiment of the present invention with additional design details and other advantages is described below and explained in greater detail with reference to the accompanying drawings, in which.

DETAILED DESCRIPTION

Figure 1:
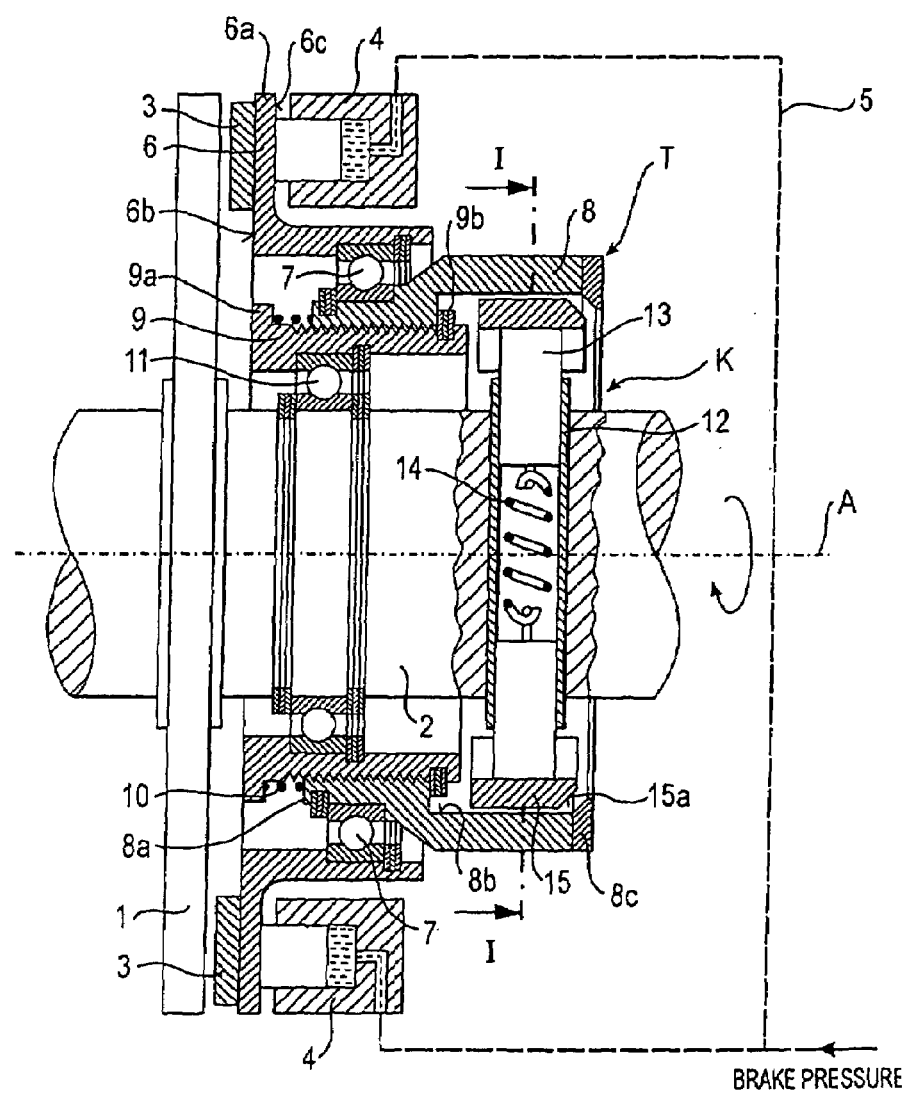
FIG. 1 shows a schematic longitudinal section through a rotor brake according to the present invention associated with a rotor.

FIG. 1 schematically shows a longitudinal section through a rotor brake according to the present invention associated with a rotor. In this example, this rotor is a tail rotor of a helicopter that is driven by a tail rotor shaft 2, referred to below for short as the rotor shaft 2. The rotor brake comprises a braking force absorption element in the form of a brake disk 1 that is non-rotatably and axially immovably connected to the rotor shaft 2. However, the brake disk 1 could fundamentally also be attached axially floatingly to the rotor shaft 2. The brake disk 1 extends essentially radially around the rotor shaft 2.

Moreover, the rotor brake is fitted with several hydraulic brake actuators 4 that are each arranged in a stationary manner, that is to say, for instance, secured to a structural component of a gear housing (not shown), and that serve to actuate a braking force transmission element 3 (here: a brake lining 3). For the sake of simplicity, reference will be made below to only one single brake actuator 4. The explanations provided in this context apply analogously to the other brake actuator(s) 4. A hydraulic line 5 for supplying pressure to the brake actuator 4 is indicated in FIG. 1 by a broken line. Instead of a hydraulic brake actuator 4, as a matter of principle, another suitable actuator, e.g. a mechanically or electromechanically or piezoelectrically operated actuator, can also be used.

Furthermore, the rotor brake according to the present invention has a rotor speed-controlled, centrifugal force-actuated rotor brake deactivation device.

The rotor brake deactivation device comprises essentially the following components: a carrier device T, on which the brake lining 3 is arranged, whereby the carrier device T—in order to exert a braking effect through the stationary brake actuator 4—can be moved relative to the brake disk 1; and a centrifugal clutch K that is driven directly by the rotor shaft 2 and that, when a predetermined rotor speed is reached, acts on the movable carrier device T or on one of its components and inhibits or blocks the ability of the carrier device T to move relative to the brake disk 1. In order to exert a braking effect, the brake lining 3 of the carrier device T can be moved or slid towards the brake disk 1 by actuating the brake actuator 4 in the axial direction A of the rotor shaft 2. The brake lining 3 functions unilaterally in this embodiment.

The carrier device T comprises an axially fixed hub 9 that is rotatably mounted on the rotor shaft 2 by means of a bearing 11 (also called internal bearing 11 below) and a drum 8 that is attached non-rotatably and axially movably on the outer circumference of the hub 9. Furthermore, the carrier device has a holder 6 that—via a bearing 7 (also called external bearing 7 below) installed on the outer circumference of the drum 8—is arranged so as to be axially fixed on the drum 8. In addition, the holder 6 is secured against rotating with respect to the brake actuator 4 by means of an anti-rotation mechanism. Here, the external bearing 7 ensures that the drum 8 can rotate relative to the holder 6. The holder 6 has a flange-like section 6a with a front face 6b that lies opposite from the brake disk 1 and onto which the brake lining 3 is affixed. Depending on the configuration, there can be additional intermediate elements, for example, in the form of rings, provided adjacent the front face 6b or adjacent the back surface 6c of the holder 6 facing the brake actuator 4.

The unit made up of the drum 8, the external bearing 7, the holder 6 and the brake lining 3 can be moved back and forth in order to exert a braking effect on the hub 9 in the axial direction A relative to the brake disk 1 by means of the brake actuator 4, as is indicated by the double arrow on the drum 8. During a braking procedure, the brake actuator 4 acts on the rear surface 6c of the flange-like section 6a or on an optionally provided intermediate element.

As can be seen in FIG. 1, between a flange-like projection 9a of the hub 9 and—on the left-hand side in FIG. 1—the front face 8a of the drum 8, there is a pre-tensioning element 10 (here a pressure spring 10) against whose pre-tensioning force the drum 8 can be moved in the axial direction A toward the brake disk 1, together with the other above-mentioned components that are attached to it. The projection 9a, together with the pressure spring 10, concurrently forms a left-hand stop for the drum 8 that limits the ability of the drum 8 to move axially in the direction of the brake disk 1. On the hub 9—on the right-hand side in FIG. 1—there is a right-hand stop 9b that limits the ability of the drum 8 and of the above-mentioned components that are attached to it to move axially in the opposite direction.

As can also be seen in FIG. 1, the centrifugal clutch K engages the drum 8 and extends at least partially through the rotor shaft 2. A component of the centrifugal clutch K is a guide sleeve 12 that runs through the rotor shaft 2 at a right angle to the rotor shaft A and that is supported on said rotor shaft 2. In the guide sleeve 12, there is a central pre-tensioning element 14 (here a tension spring 14). In the ends of the guide sleeve 12 facing the inner circumferential surface 8b of the drum 8, there are two clutch shoes 13. The inner ends of the clutch shoes 13 are connected to the tension spring 14 and can be moved against the tensioning force of the spring 14 in the lengthwise direction of the guide sleeve 12 and can thus move in the radial direction relative to the rotor shaft 2. Clutch linings 15 are affixed at each of the outer ends of the clutch shoes 13. In this example, these clutch linings 15 are friction linings. However, they can also be configured as other linings or interlocking elements that create a form-fitting engagement or a form-fitting interlock, for example, with an appropriately configured inner circumference surface 8b or with corresponding interlocking elements on the drum 8. Here, too, it should be ensured that the drum 8 can once again move axially as soon as the clutch linings of the centrifugal clutch retract at a permissible lower speed and release the form-fitting engagement or interlock.

Figure 2:
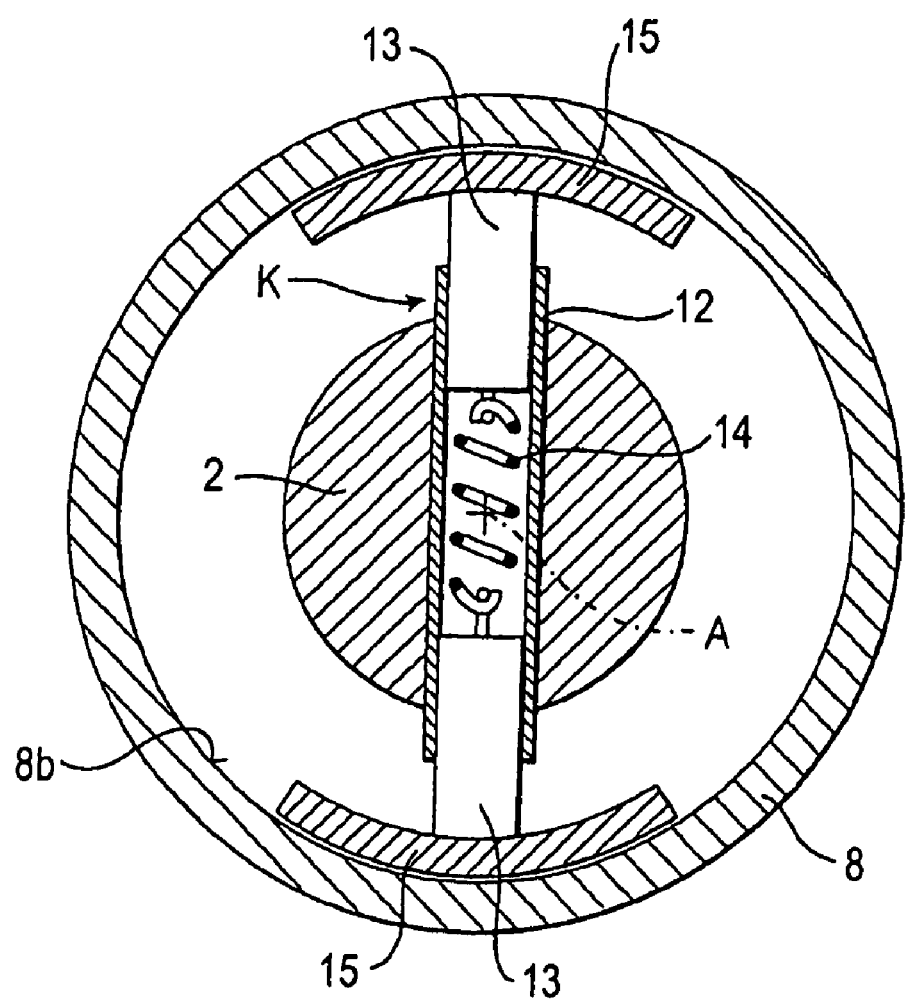
FIG. 2 shows a schematic sectional view along line A—A in FIG. 1.

Details of the centrifugal clutch K can also be seen once again in FIG. 2, which shows a schematic sectional view along line A—A in FIG. 1.

If the centrifugal clutch K is made to rotate by the rotor shaft 2 when the latter is rotating, then, as a result of the occurring centrifugal forces, the clutch shoes 13 strive to move radially towards the outside in the direction of the inner circumferential surface 8b of the drum 8. Above a predetermined first rotor shaft speed, which is preferably above 40% to 50% of the rated rotor speed, the clutch shoes 13 will press with their clutch linings 15 firmly, that is to say, with a certain force, against the inner circumferential surface 8b of the drum 8. As a result, the ability of the drum 8 or the carrier device T to move axially towards the brake disk 1 is inhibited or blocked. Conversely, above a predetermined second speed, which is lower than the above-mentioned first speed, the clutch shoes 13 with their clutch linings 15 will once again retract from the inner circumferential surface, as a result of which the drum 8 is able to move axially. The speed above which the centrifugal clutch blocks or allows the drum 8 to move axially can be determined especially by the weight of the movable clutch shoes 13 and of their clutch linings 15 as well as by the spring characteristics of the tension spring 14.

It can also be seen in FIG. 1 that the right-hand side of the drum 8 in the drawing, when looked at in a cross section, has a circumferential, beveled edge 8c (or in another possible embodiment, a kind of claw) which, when the clutch linings 15 contact the inner circumferential surface of the drum 8 and inhibit the ability of the drum 8 to move axially, becomes engaged over a right-hand front surface 15a of the clutch linings 15 or adjacent areas of the clutch shoes 13. This configuration forms an additional form-fitting protection that, in case of a malfunction in the hydraulic system of the brake actuator 4 or in case of an autonomous, for example, temperature-related pressure increase in the hydraulic system, prevents the brake actuator 4 from overcoming the inhibiting effect due to the engaging clutch linings 15 and thus prevents the brake actuator 4 from actuating the rotor brake.

Moreover, the beveled edge 8c of the drum 8 forms a deflector or a kind of spacer for the centrifugal clutch K or for its clutch shoes 13 and clutch linings 15. This deflector has the following function: if the rotor brake is actuated while the rotor is at a standstill, then the carrier device T with its brake lining 3 is moved towards the brake disk 1 and the brake lining 3 exerts a braking effect. If, starting from this state, the rotor is now revved up, that is to say, made to rotate, and if the deflector were not there, then it could happen that the centrifugal clutch K with its brake lining 3 could mesh with the drum 8 and be engaged with it. As a result, the carrier device T with its brake lining 3 could no longer be retracted and the braking effect would not be reliably discontinued. However, the deflector precisely prevents this from happening. After all, when the rotor is at a standstill and the brakes are actuated, the clutch shoes 13 are retracted and lie exactly opposite from the beveled edge 8c. If the rotor is now revved up, the clutch shoes 13 or their clutch linings 15 strike the edge 8c in the radial direction and cannot come to lie on the inner circumferential surface of the drum 8 and mesh with it. Therefore, it is possible to move the carrier device T with its brake lining 3 back again so far that the braking effect is reliably discontinued and a malfunction is avoided in this specific case.

Now, the further function of the rotor brake according to the present invention and its rotor speed-controlled, centrifugal force-actuated rotor brake deactivation device will be described in detail.

Regular Actuation of the Rotor Brake:

When the rotor shaft 2 is at a standstill or at a permissible speed, which is preferably smaller than or equal to 40% to 50% of the rated rotor speed, and if the brake actuator 4 is not actuated, then the rotor brake according to the present invention is in the starting position shown in FIGS. 1 and 2. The clutch shoes 13 of the centrifugal clutch K are retracted so far that the clutch linings 15 do not make contact with the inner circumference surface 8b of the drum 8 and so that the clutch linings 15 or their front surfaces 15a are not blocked in the axial direction A (and also in the radial direction) by the beveled edge 8c. Consequently, the drum 8 can move unhindered in the axial direction A. The rotor brake can then be activated.

When the brake actuator 4 is activated, then the carrier device T, that is to say, the unit made up of the drum 8, the external bearing 7 and the holder 6, is moved in the axial direction A to the left towards the brake disk 1, together with the brake lining 3 that is attached to the holder 6, against the pre-tensioning force of the pressure spring 10 until the brake lining 3 comes to lie against the brake disk 1 and exerts a brake force on it. The rotor shaft 2 can thus be braked in the normal manner by means of the rotor brake. If the activation of the brake actuator 4 is discontinued again, then the spring 10 autonomously presses the carrier device T into its starting position as shown in FIG. 1.

FIG. 1 clearly shows that, with the procedure of a regular braking actuation described above, the drum 8 with the spring 10 and the hub 9 exhibit an indifferent movement state, that is to say, the speed of the unit made up of these parts is not clearly definable, because they are disengaged from the rotating rotor shaft 2 by means of the internal bearing 11 and from the non-rotatably arranged holder 6 by means of the external bearing. A slight rotational movement of these parts can at best arise due to bearing friction.

Deactivation or Blocking of the Rotor Brake Against Operating Errors and Malfunctions:

However, if the rotor shaft 2 is rotating, for example, during flight of the helicopter or on the ground, above a predetermined speed, that is to say, here at a speed that is greater than about 40% to 50% of the rated rotor speed, then an actuation of the rotor brake is prevented by the rotor speed-controlled, centrifugal force-actuated rotor brake deactivation device. In order to explain the mode of action of the rotor brake deactivation device, a non-actuated state of the rotor brake is assumed that is similar to the state shown in FIGS. 1 and 2. Unlike in FIGS. 1 and 2, however, at this high speed, the clutch linings 15 press firmly against the inner circumference surface 8b of the drum 8 and create a frictional pairing contact. As a result, the ability of the drum 8 or of the carrier device T to move axially towards the brake disk 1 is inhibited and the rotor brake is blocked or deactivated, even if the brake actuator 4 is activated.

Due to the engaging centrifugal clutch K, the drum 8 is, at the same time, imparted with a rotational movement. Since the drum 8 is non-rotatably connected to the hub 9, the drum 8 and the hub 9 now rotate together with the rotor shaft 2. Here, the internal bearing 11 exhibits essentially no relative movement between its inner and outer ring, and it once again rotates together with the shaft 2 and the hub 9. Due to the external bearing 7, the drum 8 can rotate relative to the holder 6 which is standing still as a result of its anti-rotation mechanism. Hence, the rotational movement of the rotor shaft 2, of the drum 8 and of the hub 9 is disengaged from the holder 6 by the external bearing 7. The external bearing ring of the external bearing 7 that is attached to the holder 6 is always at a standstill and, for this reason, is advantageously secured in the holder 6 against rotating (for example, by a suitable press fit).

If, as a result of a malfunction in the hydraulic system or due to a temperature-related pressure increase in the hydraulic system, the brake actuator 4 overcomes the inhibiting effect of the engaging clutch linings 15 or their frictional pairing contact, then the edge 8c of the drum 8 makes contact with the right-hand front surface 15a of the clutch linings 15 or of the clutch shoes 13. Consequently, the carrier device T cannot be moved axially and as a result, an actuation of the rotor brake is also prevented in this case.

If the speed once again falls below the predetermined or defined rotor speed, the clutch shoes 13 with their clutch linings 15 automatically retract, since the centrifugal forces acting on these components are then less than the predetermined pre-tensioning force of the tension spring 14, and they also release the form-fitting engagement with the edge 8c. The rotor brake can now once again be actuated in the manner already described above.

The present invention is not limited to the embodiment above, which serves merely as a general explanation of the core idea of the present invention. Rather, within the framework of the protective scope, the rotor brake according to the present invention can also assume other configurations than the one described above.

Instead of a brake disk, for example, it is also possible to use a brake drum. Insofar as the ability of the carrier device to move axially that was described in connection with the embodiment above is to be retained, this brake drum can then have, for example, a conical shape that matches a correspondingly configured carrier device or holder and correspondingly arranged brake linings. However, it is also conceivable to use a conventional brake drum with cylindrical inner surfaces and to provide the movable carrier device or the holder with cylindrical outer surfaces on which the brake linings are then arranged. This arrangement, however, calls for a slightly longer movement path of the carrier device in order to be able to actuate the rotor brake in a regular manner.

Fundamentally, the rotor brake according to the present invention can have one or more brake actuators. With a brake disk that is axially fixed, like in the example given above, the brake linings preferably function unilaterally. With a rotor brake having a floatingly mounted brake disk or with a brake actuator having a floatingly mounted caliper, preferably bilaterally functioning brake linings are provided.

The deflector can also be realized by other means than the beveled edge 8c such as, for instance, other suitable spacers or spacing elements whose function can also be controlled by means of the centrifugal force. Depending on the configuration variant of the drum and its components, an area or element of the drum 8 resembling the beveled edge 8c can also be provided on the clutch shoes 13 as shown in the left-hand side of FIG. 1. Depending on a certain operating state of the rotor brake, the beveled edge 8c can also serve to exert a (counter) force on the clutch shoes 13 and to actively press these away from the drum or onto the drum. However, in certain cases it is also possible to dispense with the beveling of the edge 8c and to have a different shape and hence different operating behavior.

Instead of a centrifugal clutch that extends at least partially through the rotor shaft, a different centrifugal clutch can also be realized that is arranged around the rotor shaft and, for example, via inner teeth, is non-rotatably connected to outer teeth of the rotor shaft. Moreover, it is possible to arrange the centrifugal clutch separately from the rotor shaft and to drive it, for example, by an intermediate gear or the like. For such an arrangement, an appropriately modified drum or a differently designed component would be needed to take over the function of the drum.

Although the rotor brake in the embodiment above was used in conjunction with a tail rotor shaft, it can fundamentally also be used with any other rapidly rotating shafts such as, for example, in rotary-wing aircraft that are not equipped with tail rotor shafts, that is to say, in helicopters or drones with coaxial rotors, whereby the rotor brake can also act on the main rotor shaft(s).

The reference numerals in the claims, in the description and in the drawings serve merely for purposes of better understanding of the present invention and are not intended to limit the protective scope.

What is claimed is:

1. A rotor brake comprising:
   a braking force absorption element non-rotatably connected to a rotor shaft;
   a braking force transmission element functionally coupled to the braking force absorption element;
   a stationary brake actuator configured to actuate the braking force transmission element so as to exert a braking effect; and
   at least one rotor speed-controlled, centrifugal force-actuated rotor brake deactivation device.

2. The rotor brake according to claim 1, wherein the rotor brake deactivation device comprises:
   a carrier device, wherein the braking force transmission element is disposed on the carrier device and wherein the carrier device is moveable relative to the braking force absorption element so as to enable the braking effect; and
   a centrifugal clutch actuatable by the rotor shaft, wherein, when a predetermined rotor speed is reached, the centrifugal clutch acts on the movable carrier device so as to inhibit a movement of the carrier device relative to the braking force absorption element.

3. The rotor brake as recited in claim 2, wherein the centrifugal clutch is indirectly actuatable by the rotor shaft.

4. The rotor brake as recited in claim 2, wherein the braking force absorption element extends radially around the rotor shaft, and wherein the carrier device and the braking force transmission element are moveable using the brake actuator in an axial direction of the rotor shaft against the braking force absorption element.

5. The rotor brake as recited in claim 2, wherein the carrier device comprises:
an axially fixed hub rotatably mounted on the rotor shaft;
a drum disposed non-rotatably and axially movably relative to the hub; and
a holder disposed axially fixed and rotatably relative to the drum, the braking force transmission element being disposed on the holder,
wherein the drum, the holder and the braking force transmission element are axially moveable towards the braking force absorption element using the brake actuator for exerting the braking effect on the hub, and
wherein the centrifugal clutch is configured to engage the drum so as to block an axial movement of the drum when the rotor shaft exceeds a predetermined first rotor shaft speed and to allow the axial movement again when the rotor shaft rotates below a lower predetermined second rotor shaft speed.

6. The rotor brake as recited in claim 5, wherein the drum is disposed on the hub and wherein the drum, the holder, and the braking force transmission element form a single unit that is axially moveable toward the braking force absorption element.

7. The rotor brake as recited in claim 2, wherein the centrifugal clutch is non-rotatably connected to the rotor shaft.

8. The rotor brake as recited in claim 7, wherein the centrifugal clutch extends at least partially through the rotor shaft.

9. The rotor brake as recited in claim 5, further comprising a pre-tensioning element exerting a pre-tensioning force, wherein the drum is moveable in the axial direction against the pre-tensioning force in an unblocked state of the drum.

10. The rotor brake as recited in claim 5, wherein the rotor brake deactivation device includes a rotor speed-controlled additional safety device, wherein, in case of a malfunction of one of the brake actuator and the centrifugal clutch, the safety device is configured to deactivate the rotor brake and block the axial movement of the drum toward the braking force absorption element above the predetermined first rotor shaft speed and to allow the axial movement of the drum above the predetermine second rotor shaft speed.

11. The rotor brake as recited in claim 10, wherein the malfunction includes an overcoming of the blocking function of the centrifugal clutch and the drum.

12. The rotor brake as recited in claim 5, wherein the drum includes a deflector and wherein, when the braking effect is exerted at a time when the rotor exceeds the first predetermined rotor shaft speed, the deflector prevents the centrifugal clutch from meshing with the drum so as to prevent the centrifugal clutch from blocking the axial movement of the drum.

13. The rotor brake as recited in claim 12, wherein, when the braking effect is exerted at the time when the rotor exceeds the first predetermined rotor shaft speed, the deflector prevents the centrifugal clutch from meshing with the drum and enables the carrier device to move back and to discontinue the braking effect.

14. The rotor brake as recited in claim 12, wherein the braking effect is exerted when the rotor is at a standstill and continues to be exerted at the time that the rotor exceeds the first predetermined rotor shaft speed.

15. A rotor, comprising at least one rotor brake as recited in claim 1.

16. A rotary wing aircraft, comprising at least one rotor brake as recited in claim 1.

17. The rotary wing aircraft as recited in claim 13, wherein the rotary wing aircraft includes a helicopter.

* * * * *

UNITED STATES PATENT AND TRADEMARK OFFICE
CERTIFICATE OF CORRECTION

PATENT NO. : 7,168,533 B2 Page 1 of 1
APPLICATION NO. : 10/940045
DATED : January 30, 2007
INVENTOR(S) : Andreas Podratzky It is certified that error appears in the above-identified patent and that said Letters Patent is hereby corrected as shown below:

Column 3, line 51, should read:

Figure 2 shows a schematic sectional view along line A-A 1-1 in figure 1.

Column 5, line 51, should read:

Details of the centrifugal clutch K can also be seen once again in Figure 2, which shows a Schematic sectional view along line A-A 1-1 in figure 1.

Signed and Sealed this

Twenty-sixth Day of August, 2008

JON W. DUDAS
*Director of the United States Patent and Trademark Office*